(12) United States Patent
Kim et al.

(10) Patent No.: US 12,088,018 B2
(45) Date of Patent: Sep. 10, 2024

(54) 5G DUAL PORT BEAMFORMING ANTENNA

(71) Applicant: Korea Electronics Technology Institute, Seongnam-si (KR)

(72) Inventors: Ki Jin Kim, Yongin-si (KR); Kwang Ho Ahn, Yongin-si (KR); Soo Chang Chae, Changwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 374 days.

(21) Appl. No.: 17/623,093

(22) PCT Filed: Dec. 22, 2020

(86) PCT No.: PCT/KR2020/018857
§ 371 (c)(1),
(2) Date: Dec. 27, 2021

(87) PCT Pub. No.: WO2022/102862
PCT Pub. Date: May 19, 2022

(65) Prior Publication Data
US 2023/0025634 A1    Jan. 26, 2023

(30) Foreign Application Priority Data
Nov. 10, 2020  (KR) .......... 10-2020-0149089

(51) Int. Cl.
*H01Q 3/26*     (2006.01)
*H01Q 9/04*     (2006.01)
*H04B 7/06*     (2006.01)

(52) U.S. Cl.
CPC ........... *H01Q 3/26* (2013.01); *H01Q 9/0407* (2013.01); *H04B 7/0617* (2013.01)

(58) Field of Classification Search
CPC .... H01Q 19/005; H01Q 21/065; H01Q 25/00; H01Q 3/26; H01Q 3/36; H01Q 9/0407;
(Continued)

(56) References Cited

U.S. PATENT DOCUMENTS

2017/0317402 A1*  11/2017  Hwang .................. H01Q 9/045
2019/0006751 A1*   1/2019  Chen ....................... H04B 7/10
(Continued)

FOREIGN PATENT DOCUMENTS

| KR | 10-2009-0126803 A | 12/2009 |
| KR | 10-2012-0053884 A | 5/2012 |
| KR | 10-2020-0117223 A | 10/2020 |

OTHER PUBLICATIONS

Korean Office Action issued on Oct. 26, 2021 in counterpart Korean Patent Application No. 10-2020-0149089 (5 pages in English, 5 pages in Korean).

*Primary Examiner* — Timothy X Pham
(74) *Attorney, Agent, or Firm* — NSIP Law

(57) ABSTRACT

Provided is a 5G dual port beamforming antenna. The beamforming antenna according to an embodiment of the present disclosure includes a plurality of patch antennas, and the patch antenna includes: a first patch positioned on an upper portion; a second patch positioned on a left side under the first patch and having a plurality of feeding ports formed thereon; a third patch positioned on an upper portion of a right side of the second patch; and a fourth patch positioned on a lower portion of the right side of the second patch. Accordingly, 3D wide angle beamforming is possible in an antenna to be used in 5G mobile communication systems, military radar systems, etc.

20 Claims, 10 Drawing Sheets

(58) Field of Classification Search
CPC ........ H01Q 9/0421; H01Q 9/045; H04B 7/04; H04B 7/0617
See application file for complete search history.

(56) References Cited

U.S. PATENT DOCUMENTS

| | | | |
|---|---|---|---|
| 2021/0151898 A1* | 5/2021 | Han | H01Q 9/0414 |
| 2022/0077584 A1* | 3/2022 | Kwak | H01Q 5/40 |
| 2022/0311142 A1* | 9/2022 | Hwang | H01Q 9/045 |
| 2023/0299819 A1* | 9/2023 | Zhu | H01Q 21/20 |
| | | | 375/267 |

* cited by examiner

5G DUAL PORT BEAMFORMING ANTENNA

CROSS REFERENCE TO RELATED APPLICATIONS

This application is a U.S. National Stage Application of International Application No. PCT/KR2020/018857, filed on Dec. 22, 2020, which claims the benefit under 35 USC 119(a) and 365(b) of Korean Patent Application No. 10-2020-0149089, filed on Nov. 10, 2020, in the Korean Intellectual Property Office, the entire disclosure of which is incorporated herein by reference for all purposes.

TECHNICAL FIELD

The present disclosure relates to antenna-related technology, and more particularly, to a beamforming antenna which can be utilized in a millimeter wave 5G mobile communication system, which is currently in preparation for next-generation mobile communication.

BACKGROUND ART

Most of the antennas used in a 5G millimeter frequency may be patch antennas and may have a relatively narrow bandwidth. Since a bandwidth of 10% or more is used in the 5G frequency, many researches on a structure for increasing a bandwidth of a patch antenna have been conducted.

FIG. 1 illustrates a structure for increasing an antenna bandwidth by using a basic patch antenna. However, since a high frequency of 28 GHz or higher is used in the 5G millimeter frequency, there may be a big loss in transmission of full waves as shown in FIG. 2.

Accordingly, to compensate for the loss, a beamforming technique should be applied. FIG. 3 illustrates a beamforming antenna structure.

The beamforming antenna may include a plurality of array antenna radiators, and a block called a phase shifter may be attached to each of the antennas to adjust a radiation pattern by aligning a full wave phase of a signal outputted from/inputted to the antenna in a specific direction (θ).

FIG. 4 illustrates a configuration of a 2×2 patch antenna which is mostly frequently used. Considering a 5G system configuration, it is known that a patch antenna structure is most suitable for beamforming.

FIGS. 5 and 6 illustrate results of a simulation when 16 patch antennas are implemented by a 4×4 pattern. FIG. 5 shows a radiation pattern when a main lobe is 0 degree, and FIG. 6 shows a radiation pattern when a main lobe is 55 degrees.

As shown in the drawings, in consideration of a radiation and a level of a side lobe when a beamforming antenna is configured, an antenna radiation angle is normally about ±50. 3D beamforming may be completely performed only if this characteristic appears not only on the X-Z plane but also on the Y-Z plane.

However, it may be difficult to satisfy such beamforming characteristic even in a wide bandwidth of 5G.

DISCLOSURE

Technical Problem

The present disclosure has been developed in order to address the above-discussed deficiencies of the prior art, and an object of the present disclosure is to provide a dual port beamforming antenna to be used in a 5G mobile communication system, as a solution for enabling 3D wide angle beamforming.

Technical Solution

According to an embodiment of the present disclosure to achieve the above-described object, a beamforming antenna includes a plurality of patch antennas, and the patch antenna includes: a first patch positioned on an upper portion; a second patch positioned on a left side under the first patch and having a plurality of feeding ports formed thereon; a third patch positioned on an upper portion of a right side of the second patch; and a fourth patch positioned on a lower portion of the right side of the second patch.

The second patch may include: a first feeding port formed on an upper portion; and a second feeding port formed on a lower portion, and feeding may be selectively performed through the first feeding port and the second feeding port.

When feeding is performed through the first feeding port, a radiation angle may increase on a first plane.

When feeding is performed through the second feeding port, the radiation angle may increase on a second plane which is perpendicular to the first plane.

The first patch and the second patch may have areas larger than the third patch and the fourth patch, and the third patch and the fourth patch may have the same shape.

The second patch, the third patch, and the fourth patch may have ground vias formed thereon.

The second patch may have a ground via formed on a left region thereof. In addition, the third patch and the fourth patch may have ground vias formed on a right region thereof.

The patch antennas may be connected in the form of wire bonding or bumping.

According to another embodiment of the present disclosure, a patch antenna includes: a first patch positioned on an upper portion; a second patch positioned on a left side under the first patch and having a plurality of feeding ports formed thereon; a third patch positioned on an upper portion of a right side of the second patch; and a fourth patch positioned on a lower portion of the right side of the second patch.

According to still another embodiment of the present disclosure, a communication system includes: a beamforming antenna including a plurality of patch antennas; and a communication module configured to generate a transmission signal and to transmit the transmission signal through the beamforming antenna, and to receive a signal through the beamforming antenna, and the patch antenna includes: a first patch positioned on an upper portion; a second patch positioned on a left side under the first patch and having a plurality of feeding ports formed thereon; a third patch positioned on an upper portion of a right side of the second patch; and a fourth patch positioned on a lower portion of the right side of the second patch.

According to yet another embodiment of the present disclosure, a communication method includes the steps of: generating, by a communication module, a transmission signal; transmitting, by the communication module, the generated transmission signal through a beamforming antenna including a plurality of patch antennas; and receiving, by the communication module, a signal through the beamforming antenna, and the patch antenna includes: a first patch positioned on an upper portion; a second patch positioned on a left side under the first patch and having a plurality of feeding ports formed thereon; a third patch positioned on an upper portion of a right side of the second patch; and a fourth patch positioned on a lower portion of the right side of the second patch.

Advantageous Effects

According to embodiments of the present disclosure as described above, wide angle characteristics may be implemented not only on the X-Z plane but also on the Y-Z plane through the dual port beamforming antenna, and therefore, 3D wide angle beamforming is possible on an antenna to be used for 5G mobile communication systems, military radar systems, etc.

BEST MODE

Hereinafter, the present disclosure will be described in more detail with reference to the drawings.

Embodiments of the present disclosure suggest a dual port beamforming antenna. The dual port beamforming antenna operates a dual feeding port to be able to provide 3D beamforming in millimeter wave communication, military radar systems, etc.

Figure 1:
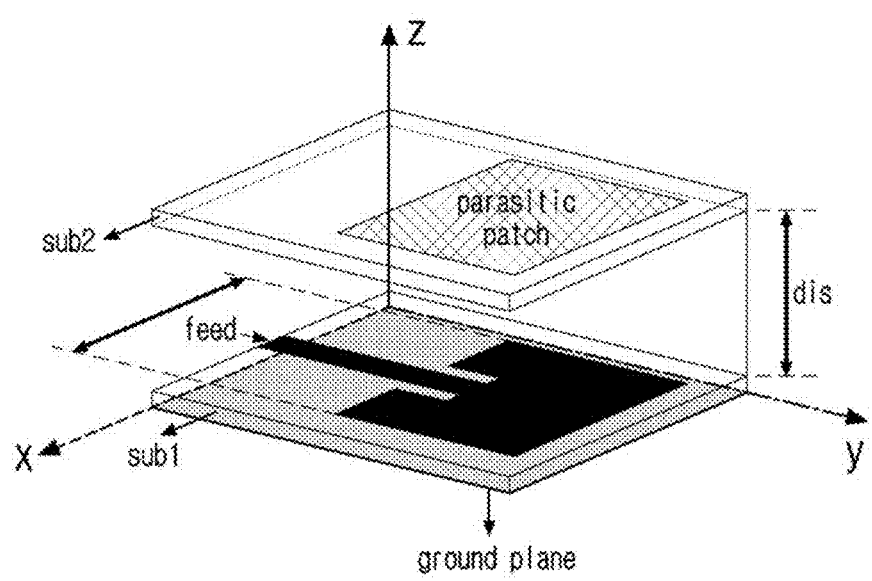
FIG. 1 is a view illustrating a structure for increasing an antenna bandwidth by using a basic patch antenna.
Figure 2:
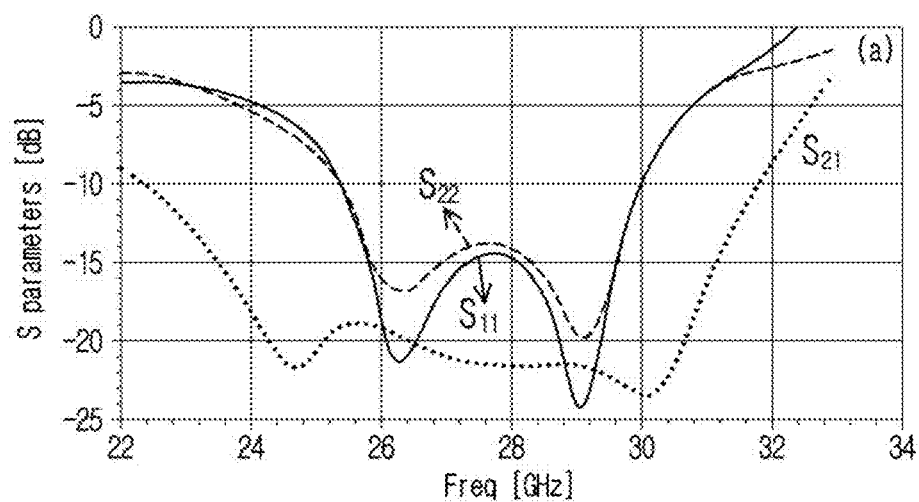
FIG. 2 is a view illustrating a frequency bandwidth of the antenna shown in FIG. 1.
Figure 3:
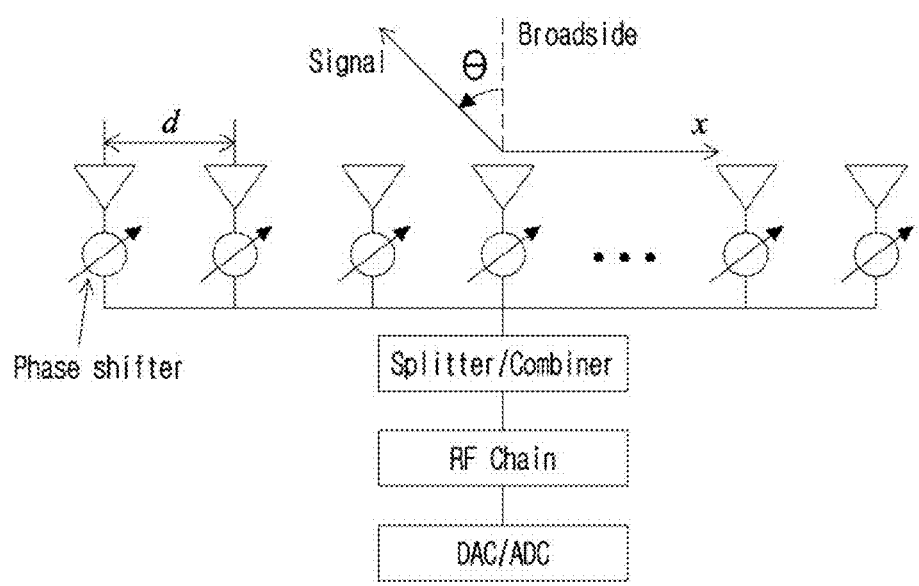
FIG. 3 is a view illustrating a beamforming antenna structure.
Figure 4:
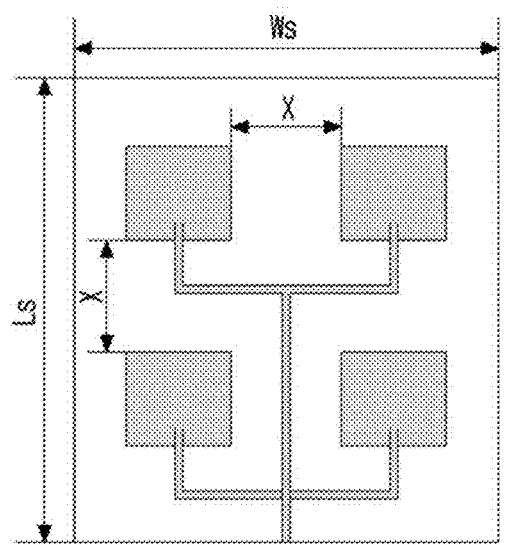
FIG. 4 is a view illustrating a configuration of a 2×2 patch antenna.
Figure 5:
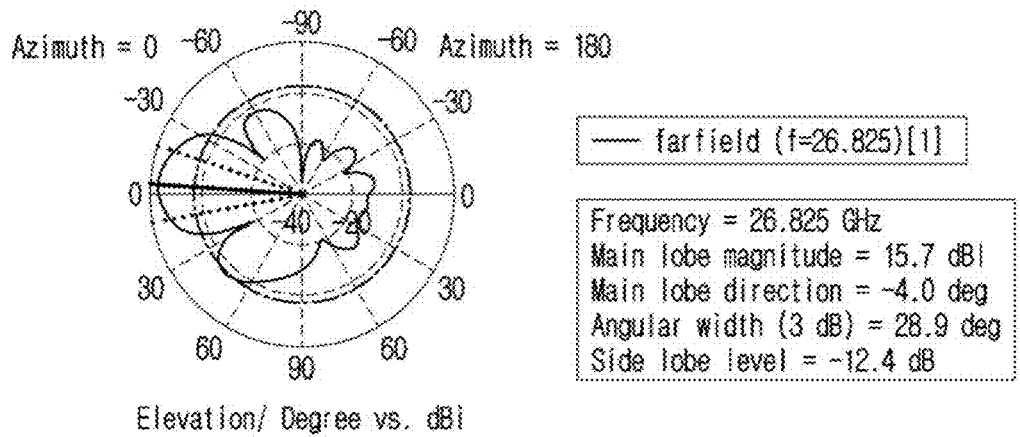
FIGS. 5 and 6 are views illustrating results of a simulation regarding beamforming of a 4×4 patch antenna.
Figure 6:
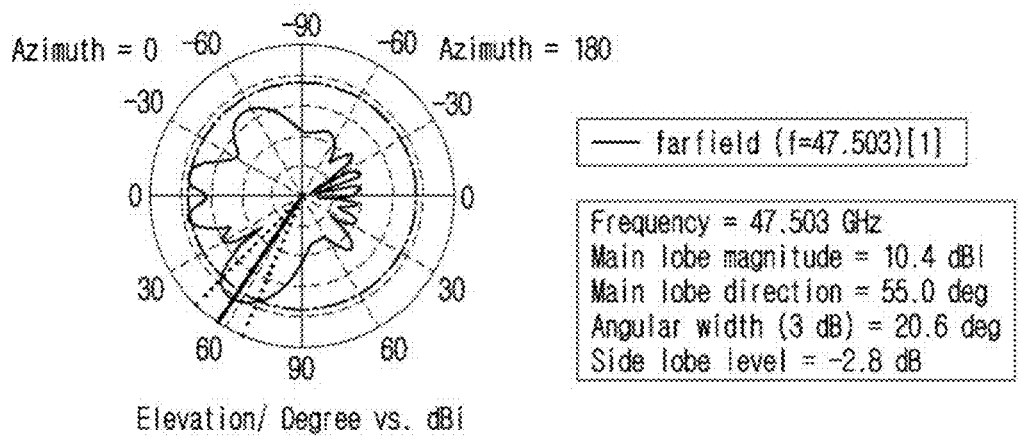
Figure 7:
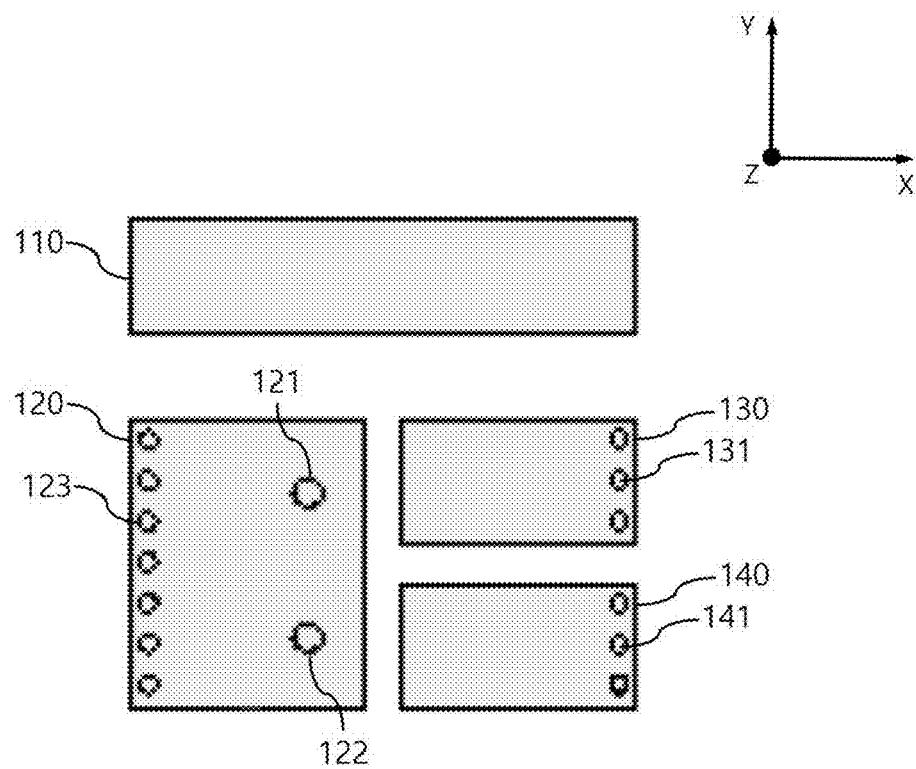
FIG. 7 is a view illustrating a structure of a dual port patch antenna according to an embodiment of the present disclosure.

FIG. 7 is a view illustrating a structure of a dual port patch antenna according to an embodiment of the present disclosure. The dual port patch antenna according to an embodiment of the present disclosure enables 3D beamforming by configurating a dual feeding port.

The dual port patch antenna according to an embodiment of the present disclosure may include a plurality of patches, specifically, a patch-1 110, a patch-2 120, a patch-3 130, and a patch-4 140, as shown in FIG. 7.

The patch-1 110 may be positioned on an upper portion of the dual port patch antenna, and may be shaped to have a horizontal width longer than a vertical width. The horizontal width of the patch-1 110 may be two times longer than a horizontal width of the other patches 120, 130, 140, which will be described below.

The patch-2 120 may be positioned on a left side under the patch-1 110 and may be shaped to have a vertical width longer than a horizontal width. The vertical width of the patch-2 120 may be two times longer than a vertical width of the patch-3 130 and the patch-4 140.

The patch-3 130 may be positioned on an upper portion of a right side of the patch-2 120, and the patch-4 140 may be positioned on a lower portion of the right side of the patch-2 120. The patch-3 130 and the patch-4 140 may be implemented in the same shape.

A horizontal width of the patch-3 130 and the patch-4 140 may be shorter than that of the patch-1 110, and a vertical width may be shorter than that of the patch-2 120, such that the whole size/area of the patch-3 130 and the patch-4 140 is smaller than the patch-1 110 and the patch-2 120.

The patch-2 120, the patch-3 130, and the patch-4 140 may have ground vias formed thereon. Regions where the ground vias are formed may vary from patch to patch.

Specifically, the ground vias 123 may be formed on a left region of the patch-2 120, whereas the ground vias may be formed on a right region 131, 141 of the patch-3 130 and the patch-4 140.

The patch-2 120 may have two feeding ports 121, 122 formed thereon. The feeding port-1 121 may be formed on an upper portion of the patch-2 120, and the feeding port-2 122 may be formed on a lower portion of the patch-2 120.

Feeding may be selectively performed through the feeding port-1 121 and the feeding port-2 122. That is, feeding may be performed through the feeding port-1 121 or feeding may be performed through the feeding port-2 122.

Figure 8:
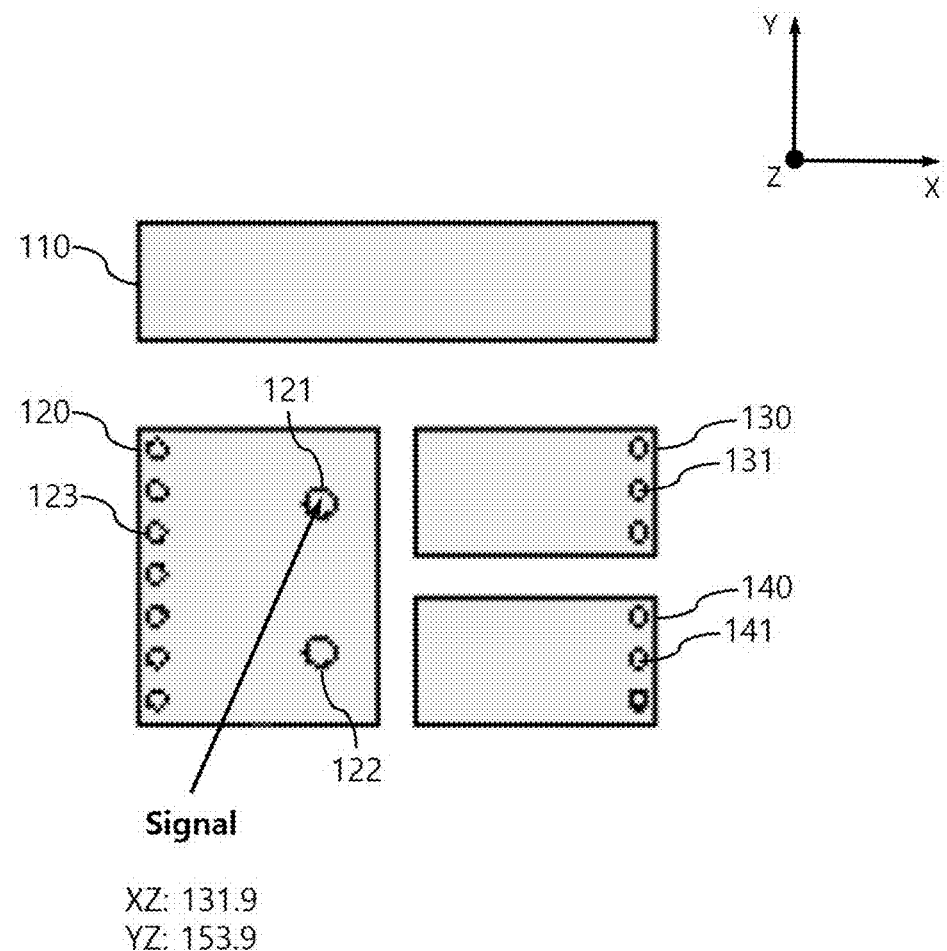
FIG. 8 is a view illustrating a result of a simulation when feeding is performed through a feeding port-1 of FIG. 7.

As shown in the drawing, when feeding is performed through the feeding port-1 121 on the assumption that the patch antenna is formed on the X-Y plane, a radiation angle increases on the Y-Z plane as shown in the result of the simulation of FIG. 8. Specifically, referring to FIG. 8, a radiation angle on the X-Z plane is 131.9 degree, but a radiation angle on the Y-Z plane increases to 153.9 degrees.

Figure 9:
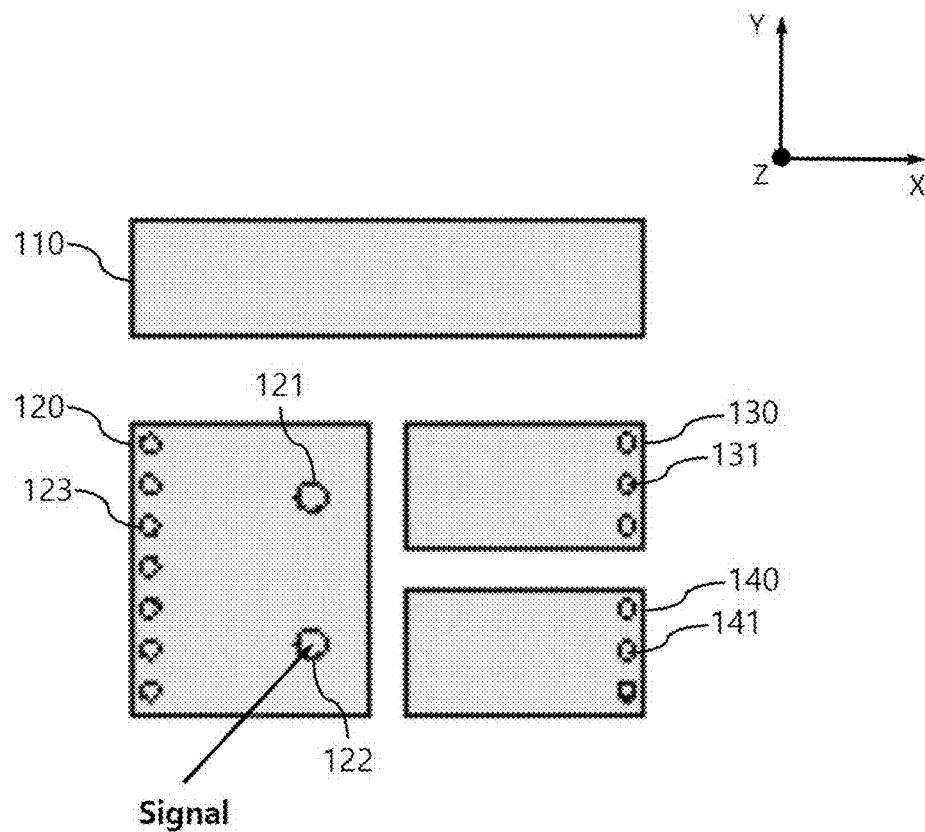
FIG. 9 is a view illustrating a result of a simulation when feeding is performed through a feeding port-2 of FIG. 7.

On the other hand, when feeding is performed through the feeding port-2 122, the radiation angle increases on the X-Z plane as shown in the result of the simulation in FIG. 9. Specifically, referring to FIG. 9, a radiation angle on the Y-Z plane is 134.9 degrees, but a radiation angle on the X-Z plane increases to 154.9 degrees.

When a beamforming control chip (not shown) controls switching between the port-1 121 and the port-2 122 and the radiation angle on both the X-Z plane and the Y-Z plane is implemented by a wide angle, 3D beamforming may be possible.

Figure 10:
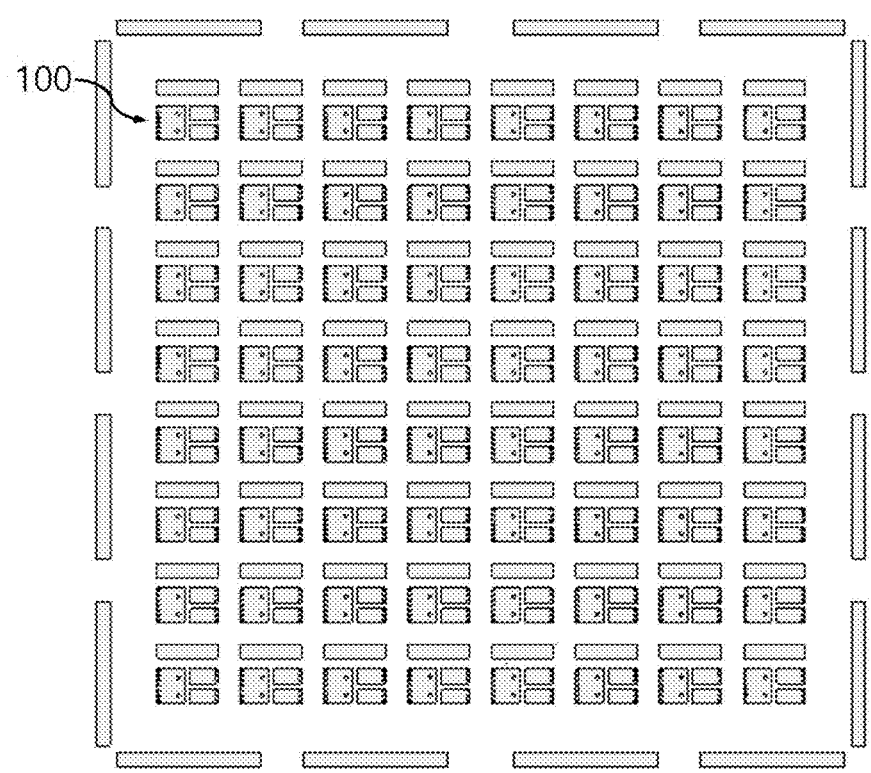
FIG. 10 is a view illustrating a structure of a beamforming antenna according to another embodiment of the present disclosure.

FIG. 10 is a view illustrating a structure of a beamforming antenna according to another embodiment of the present disclosure. The beamforming antenna according to an embodiment of the present disclosure may include a plurality of dual port patch antennas 100.

The plurality of dual port patch antennas 100 may be connected in the form of wire bonding or bumping.

FIG. 10 illustrates the beamforming antenna in which the dual port patch antennas 100 are arranged by 8×8. However, there is no limit to the array structure and the dual port patch antennas 100 may be arranged in a different form.

As a result of simulating the beamforming antenna suggested in FIG. 10, when a signal is applied to a port-1 in the plurality of dual port patch antennas 100, beam scanning of 138 degrees is possible on the X-Z axis, and, when a signal is applied to a port-2, beam scanning of 138 degrees is possible on the Y-Z axis.

Figure 11:
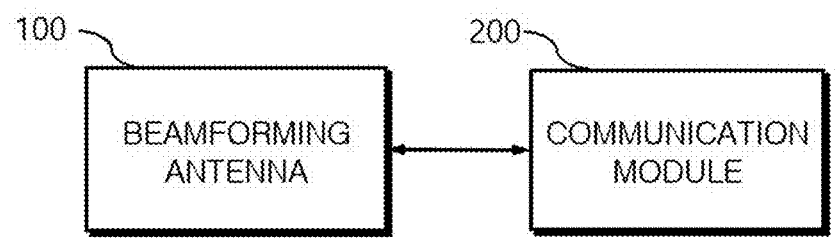
FIG. 11 is a block diagram of a communication system according to still another embodiment of the present disclosure.

FIG. 11 is a block diagram of a communication system according to still another embodiment of the present disclosure. The communication system according to still another embodiment of the present disclosure may include a beamforming antenna 100 and a communication module 200 as shown in FIG. 11.

Since the configuration of the beamforming antenna 100 has been described above through FIG. 10, a detailed description thereof is omitted.

The communication module 200 generates a transmission signal and transmits the transmission signal through the beamforming antenna 100. In addition, the communication module 200 performs necessary signal processing with respect to a signal received through the beamforming antenna 100.

Furthermore, the communication module 200 may control a feeding port in the beamforming antenna 100.

Up to now, the dual port patch antenna, the beamforming antenna implemented by arranging the dual port patch antennas, and the communication system applying the same have been described with reference to preferred embodiments.

In embodiments of the present disclosure, a technical configuration for 3D wide angle beamforming is suggested for an antenna to be used in a 5G mobile communication beamforming system, and there are effects of satisfying wideband characteristics and simultaneously satisfying 3D beamforming characteristics, and the present disclosure may be applied to a millimeter wave 5G antenna in the future.

Technology suggested in embodiments of the present disclosure relates to millimeter wave communication and radar components, module and system, and may be utilized only in millimeter wave 5G mobile communication beamforming systems, which are currently in preparation as next-generation mobile communication, but also in military radar systems and detectors.

There is no limit to the embodying range of technologies suggested in embodiments of the present disclosure. That is, the suggested technologies may be included in the technical range of the present disclosure when a communication system is implemented, a beamforming antenna is implemented, or also only a dual port patch antenna is implemented.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A beamforming antenna comprising a plurality of patch antennas,
wherein the patch antenna comprises:
a first patch positioned on an upper portion;
a second patch positioned on a left side under the first patch and having a plurality of feeding ports formed thereon;
a third patch positioned on an upper portion of a right side of the second patch; and
a fourth patch positioned on a lower portion of the right side of the second patch,
wherein a respective horizontal width of the third patch and the fourth patch is shorter than a horizontal width of the first patch, and a respective vertical width of the third patch and the fourth patch is shorter than a vertical width of the second patch.

2. The beamforming antenna of claim 1, wherein the second patch comprises:
a first feeding port formed on an upper portion; and
a second feeding port formed on a lower portion,
wherein feeding is selectively performed through the first feeding port and the second feeding port.

3. The beamforming antenna of claim 2, wherein, when feeding is performed through the first feeding port, a radiation angle increases on a first plane.

4. The beamforming antenna of claim 3, wherein, when feeding is performed through the second feeding port, the radiation angle increases on a second plane which is perpendicular to the first plane.

5. The beamforming antenna of claim 1, wherein the first patch and the second patch have areas larger than the third patch and the fourth patch, and
wherein the third patch and the fourth patch have the same shape.

6. The beamforming antenna of claim 1, wherein the second patch, the third patch, and the fourth patch have ground vias formed thereon.

7. The beamforming antenna of claim 6, wherein the second patch has a ground via formed on a left region thereof.

8. The beamforming antenna of claim 7, wherein the third patch and the fourth patch have ground vias formed on a right region thereof.

9. The beamforming antenna of claim 1, wherein the patch antennas are connected in the form of wire bonding or bumping.

10. A patch antenna comprising:
a first patch positioned on an upper portion;
a second patch positioned on a left side under the first patch and having a plurality of feeding ports formed thereon;
a third patch positioned on an upper portion of a right side of the second patch; and
a fourth patch positioned on a lower portion of the right side of the second patch,
wherein a respective horizontal width of the third patch and the fourth patch is shorter than a horizontal width of the first patch, and a respective vertical width of the third patch and the fourth patch is shorter than a vertical width of the second patch.

11. A communication system comprising:
a beamforming antenna comprising a plurality of patch antennas; and
a communication module configured to generate a transmission signal and to transmit the transmission signal through the beamforming antenna, and to receive a signal through the beamforming antenna,
wherein the patch antenna comprises:
a first patch positioned on an upper portion;
a second patch positioned on a left side under the first patch and having a plurality of feeding ports formed thereon;
a third patch positioned on an upper portion of a right side of the second patch; and
a fourth patch positioned on a lower portion of the right side of the second patch,
wherein a respective horizontal width of the third patch and the fourth patch is shorter than a horizontal width of the first patch, and a respective vertical width of the third patch and the fourth patch is shorter than a vertical width of the second patch.

12. A communication method comprising the steps of:
generating, by a communication module, a transmission signal;

transmitting, by the communication module, the generated transmission signal through a beamforming antenna comprising a plurality of patch antennas; and
receiving, by the communication module, a signal through the beamforming antenna,
wherein the patch antenna comprises:
a first patch positioned on an upper portion;
a second patch positioned on a left side under the first patch and having a plurality of feeding ports formed thereon;
a third patch positioned on an upper portion of a right side of the second patch; and
a fourth patch positioned on a lower portion of the right side of the second patch,
wherein a respective horizontal width of the third patch and the fourth patch is shorter than a horizontal width of the first patch, and a respective vertical width of the third patch and the fourth patch is shorter than a vertical width of the second patch.

13. The method of claim 12, wherein the second patch comprises:
a first feeding port formed on an upper portion; and
a second feeding port formed on a lower portion,
wherein feeding is selectively performed through the first feeding port and the second feeding port.

14. The method of claim 13, wherein, when feeding is performed through the first feeding port, a radiation angle increases on a first plane.

15. The method of claim 14, wherein, when feeding is performed through the second feeding port, the radiation angle increases on a second plane which is perpendicular to the first plane.

16. The method of claim 12, wherein the first patch and the second patch have areas larger than the third patch and the fourth patch, and
wherein the third patch and the fourth patch have the same shape.

17. The method of claim 12, wherein the second patch, the third patch, and the fourth patch have ground vias formed thereon.

18. The method of claim 17, wherein the second patch has a ground via formed on a left region thereof.

19. The method of claim 18, wherein the third patch and the fourth patch have ground vias formed on a right region thereof.

20. The method of claim 12, wherein the patch antennas are connected in the form of wire bonding or bumping.

\* \* \* \* \*